Jan. 10, 1933. S H H. KUENZEL 1,894,102
GUARD FOR AUTOMOBILE DOORS
Filed Feb. 21, 1931
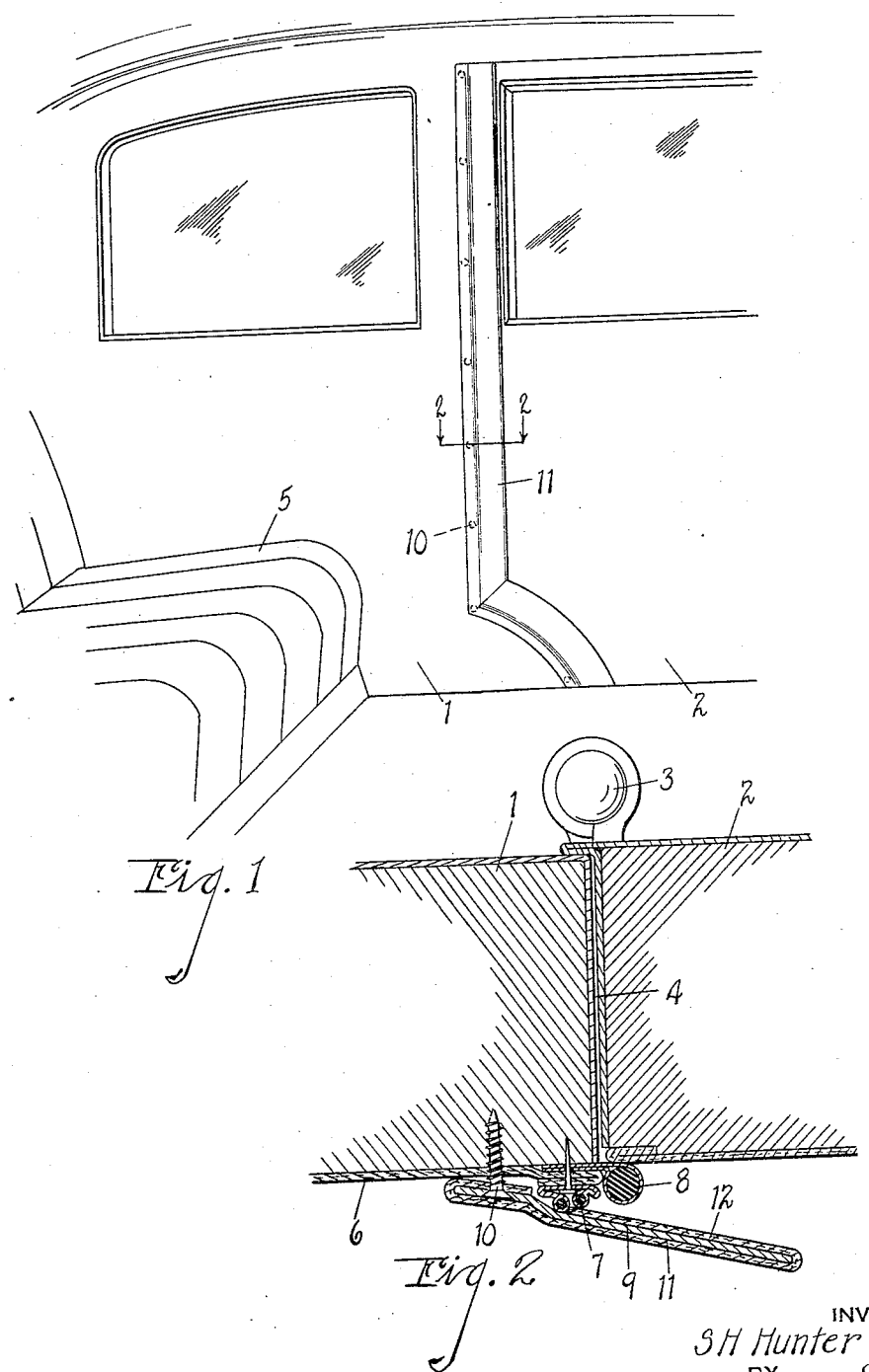
INVENTOR
S H Hunter Kuenzel
BY
Chappell & Earl
ATTORNEYS Patented Jan. 10, 1933

1,894,102

UNITED STATES PATENT OFFICE

S H HUNTER KUENZEL, OF KALAMAZOO, MICHIGAN, ASSIGNOR TO CHECKER CAB MANUFACTURING CORPORATION, OF KALAMAZOO, MICHIGAN

GUARD FOR AUTOMOBILE DOORS

Application filed February 21, 1931. Serial No. 517,433.

The main object of this invention is to provide in taxicabs and like motor vehicles a means for guarding the door so that injury is not likely to result from closing the door upon the fingers of an occupant of the vehicle.

A further object is to provide a structure having these advantages which does not detract from the appearance of the vehicle or add considerably to the expense thereof.

Objects pertaining to details and economies of my invention will definitely appear from the description to follow. The invention is defined in the claims.

A structure embodying the features of my invention is clearly illustrated in the accompanying drawing, in which:

Fig. 1 is a fragmentary inside view of a motor vehicle embodying the features of my invention.

Fig. 2 is an enlarged detail section on line 2—2 of Fig. 1.

In the accompanying drawing 1 represents a motor vehicle body and 2 one of the doors thereof. The door 2 is hinged at 3 to close inwardly into the door opening 4, the hinge being at the rear edge of the door and adjacent the seat 5. The body has a lining 6 provided with a finishing strip 7 along the edge of the door opening. A weather-strip or dust guard 8 is secured beneath the finishing strip.

I provide a finger guard 9 formed of a strip of sheet metal, the rear edge of which is secured by means of the screws 10 at the rear of the finishing strip 7 and in overlapping relation thereto. The finger guard is provided with a facing or covering 11, the rear edge of which is folded around the rear edge of the guard and secured by the screw 10 and by means of the clamping action of the rear edge of the guard against the wall of the vehicle. The strip is then folded or drawn around the finger guard and its edge 12 inserted between the finger guard and the finishing strip. The edge is preferably glued to the inner side of the guard.

The guard may be finished with the same material as the lining of the vehicle body or provided with imitation leather or other suitable covering. The guard projects substantially beyond the rear edge of the door opening and is directed inwardly so that when the door is closed the guard lies in a diverging relation to the plane or inner side of the door. The guard projects sufficiently so that an occupant of the vehicle cannot grasp the rear edge of the door opening and, therefore, closing the door upon the fingers is prevented.

While my improvements are especially desirable and designed for use in taxicabs and public vehicles, they may be readily embodied in vehicles intended for private use as they do not detract from the appearance thereof.

Having thus described my invention what I claim as new and desire to secure by Letters Patent is:

1. The combination in a motor vehicle body provided with a door opening, of a door hinged at the edge of the opening to swing inwardly in closing, a lining finishing strip at the rear edge of the door opening, a guard strip mounted on the inside of the body at the rear edge of the door opening to overlap said finishing strip and projecting substantially beyond the same relative to the door, and a covering for said guard folded around its edges, the outer edge of said covering being in overlapping relation to said finishing strip, said finishing strip supporting the guard strip in inwardly inclined position relative to the opening.

2. The combination in a motor vehicle body provided with a door, of a door opening hinged at the edge of the opening to swing inwardly in closing, a lining finishing strip at the rear edge of the door opening, a guard strip mounted on the inside of the body at the rear edge of the door opening to overlap said finishing strip and projecting substantially beyond the same, and a covering for said guard folded around its edges, said finishing strip supporting the guard strip in inwardly inclined position relative to the opening.

In witness whereof I have hereunto set my hand.

S H HUNTER KUENZEL.